2,818,436

KETONE SYNTHESIS

Erhard J. Prill, Dayton, Ohio, assignor to Monsanto Chemical Company, St. Louis, Mo., a corporation of Delaware No Drawing. Application July 15, 1955
Serial No. 522,387

3 Claims. (Cl. 260—591)

This invention relates to a new method of manufacture of ketones.

It is an object of this invention to provide a new method for the manufacture of aryl ketones. It is a further object of the present invention to provide a new catalyst composition for the condensation of acids with aromatic hydrocarbons.

These and other objects of this invention are provided by contacting an aromatic monocarboxylic acid with an aromatic hydrocarbon in the presence of a catalyst consisting of phosphorus pentoxide and a hydrogen halide.

The acids which may be used in the present process may be any aromatic monocarboxylic acid, such as benzoic acid, p-toluic acid, 2,5-dimethylbenzoic acid, $\alpha$-naphthoic acid, m-chlorobenzoic acid, anisic acid, 2,5-cresotic acid, etc.

The aromatic hydrocarbon compounds which may be acylated by the process of this invention include, e. g., hydrocarbons such as benzene, naphthalene, biphenyl, phenanthrene, hydrindene, acenaphthene, etc., as well as alkylated aromatic compounds such as toluene, o-, m- and p-xylene, mesitylene, pseudocumene, durene, ethylbenzene, m-diethylbenzene, cumene, p-cymene, t-butylbenzene, dodecylbenzene, 4-benzylbiphenyl, $\beta$-ethylnaphthalene, retene, etc.

The products which may be manufactured by the present process are diaryl ketones, which are useful as agricultural toxicants, plasticizers, etc., such as benzophenone, 4-methylbenzophenone, 4-chlorobenzophenone, 2,4'-dimethylbenzophenone, 3,4'-dimethylbenzophenone, 4-methoxylbenzophenone, 1-naphthyl phenyl ketone, 2-ethyl-1-naphthyl p-tolyl ketone, 4-dodecylbenzophenone, 4 - phenylbenzophenone, 3,3',4 - trimethylbenzophenone, 2,4,6-trimethylbenzophenone, etc. Generally, when alkyl-aromatic hydrocarbons are utilized in the present process, the acyl substituent enters the molecule in a position para to an alkyl group.

In carrying out the present reaction, the aromatic carboxylic acid and the aromatic hydrocarbon, which may be reacted in approximately equimolecular amounts, are simply brought into intimate contact with the catalyst mixture. To about one mole of acid, there may be used, for example, about ¼ to ⅔ mole of phosphorus pentoxide and small amounts, i. e., on the order of 0.1 to 0.001 mole, of hydrogen halide. The catalyst mixture should be as intimately dispersed in the reaction mixture as possible. The phosphorus pentoxide may be added to the reaction mixture, for example, as a finely divided solid which can be dispersed readily, or, if desired, inert adjuvants which assist in dispersing the catalyst mixture may be used. As inert dispersing adjuvants which are efficient dispersing agents for phosphorus pentoxide and which prevent the agglomeration of the phosphorus oxide into clumps of lesser reactive surface area, there may be used any inert carrier material, such as a solid of low density and high bulking factor, e. g., finely divided siliceous oxides. For example, such inert carriers as diatomaceous earth, finely divided silica gel or silica aerogel are useful dispersing agents for this purpose. A suitable proportion may be, e. g., equal parts of carrier and phosphorus oxide, though this ratio may be varied to suit.

To attain the requisite intimate distribution of the hydrogen halide component of the catalyst mixture, I prefer to utilize this reactant in the gaseous form, though the alternative method of addition of concentrated hydrohalogen acid is not excluded from the scope of this invention. The use of gaseous hydrogen halide, moreover, aside from the excellent dispersion obtained, has the additional advantage over the acid solution of not introducing any water into the reaction. Water added, for example, in an aqueous solution of the hydrogen halide, will react with and remove from availability a portion of the phosphorus pentoxide introduced into the reaction mixture. While water is evolved in the course of the present reaction; and thus no special precautions to maintain anhydrous conditions are necessary, to avoid waste of the catalyst mixture, it is preferred to operate the present reaction with relatively dry reactants.

Solvents or diluents, such as a petroleum hydrocarbon fraction of suitable boiling range, e. g., 125–175° C., may or may not be used. Suitably, solvent or diluent for the reaction mixture may be supplied if desired, e. g., to facilitate stirring the mixture, by using an excess of the aromatic hydrocarbon reactant, where this is a liquid at reaction temperature. Per equivalent of aromatic acid, 2 to 3 or more equivalents of aromatic hydrocarbon may be supplied to the reaction mixture; unreacted hydrocarbon is readily recovered after the reaction is complete, and may be re-used for further reaction. Thus, a suitable reaction mixture for the present process may comprise one equivalent of aromatic monocarboxylic acid, two equivalents of aromatic hydrocarbon, and as catalyst, one-half molar equivalent of phosphorus pentoxide and three hundredths of one equivalent of gaseous hydrogen chloride.

The mixture is heated to accelerate the reaction. Conveniently, it may be heated to the refluxing temperature of the acid-hydrocarbon mixture. In general, lower temperatures require longer times of reaction; if desired, the reflux/reaction temperature of the mixture may be altered by varying the pressure upwards or downwards from atmospheric pressure. The process may be operated as a batch process or continuously. Recovery of the products is achieved by extraction, distillation, etc.

The improvement achieved by the present method as compared to the older, known method using phosphorus pentoxide alone as catalyst is illustrated by the following examples:

*Example 1.—$P_2O_5$ alone*

A mixture consisting of 122 grams (1 mole) of benzoic acid, 212 grams (2 moles) of o-xylene, and 50 grams (about ⅓ mole) of phosphorus pentoxide was charged to a flask fitted with a stirrer and condenser. The mixture was refluxed, at about 152° C., for 18.5 hours, after which the liquid supernatant layer above a black deposit which was found to have been formed in the flask was decanted, washed first with a solution of 40 grams of sodium hydroxide in 400 grams of water, and then with water alone, and fractionated. After removal of 169 grams of unreacted xylene, there were obtained 53 grams of 3,4-dimethylbenzophenone (B. 128–130° C./0.1 mm., $n_D{}^{25}$ 1.5965). This is a 25 percent yield of the ketone.

*Example 2.—$P_2O_5$+HCl*

A mixture of 122 grams of benzoic acid, 212 grams of o-xylene, and 50 grams of phosphorus pentoxide was charged to a flask, as above. As the temperature of the reaction mixture was raised, gaseous hydrogen chloride was passed through the reaction mixture, to the extent of about 3 grams in weight, and the mixture was then refluxed for 16.5 hours. At the end of this time, the reaction mass was treated with 500 ml. of water, and the organic layer which separated was then washed with a sodium hydroxide solution. The emulsion formed by the latter step was broken by adding 100 ml. of benzene and boiling; then the aqueous layer was discarded and the remaining organic liquid was distilled. There were obtained 124 grams of 3,4-dimethylbenzophenone (B. 150°–154° C./0.9 mm.), which is a 59 percent yield of ketone.

The above exemplary details of a ketone synthesis in accordance with the present invention demonstrate the unexpected superiority over the prior art that is inherent in the catalytic process of this invention; the yield of ketone is more than double that obtained by the older process.

It is apparent that various other embodiments or modifications not specifically illustrated herein are possible without departure from the spirit or scope of the invention, and it is not intended to be limited except as indicated in the appended claims.

What is claimed is:

1. The process which comprises contacting an aromatic monocarboxylic acid with an aromatic hydrocarbon of from 6 to 18 carbon atoms, in the presence of a major amount of phosphorus pentoxide and a minor amount of hydrogen chloride, and isolating from the resulting reaction product a diaryl ketone.

2. The process which comprises contacting benzoic acid with an aromatic hydrocarbon of from 6 to 18 carbon atoms, in the presence of a major amount of phosphorus pentoxide and a minor amount of hydrogen chloride and isolating from the resulting reaction product a diaryl ketone.

3. The process which comprises contacting benzoic acid with o-xylene in the presence of a major amount of phosphorus pentoxide and a minor amount of hydrogen chloride, and isolating from the resulting reaction produce 3,4-dimethylbenzophenone.

References Cited in the file of this patent

UNITED STATES PATENTS

| 1,966,797 | Groggins et al. | July 17, 1934 |
| 2,238,594 | Malishev | Apr. 15, 1941 |
| 2,645,663 | Newton | July 14, 1953 |

FOREIGN PATENTS

| 281,802 | Germany | Jan. 27, 1915 |

OTHER REFERENCES

Mellor: Comprehensive Treatise on Inorganic and Theoretical Chemistry, vol. 8, p. 944 (1928).